(12) United States Patent  
Rodriguez et al.

(10) Patent No.: US 12,437,234 B2  
(45) Date of Patent: Oct. 7, 2025

(54) SYSTEM AND METHOD FOR OPTIMAL DRIVE CONFIGURATION USING MACHINE LEARNING

(71) Applicant: ABB Schweiz AG, Baden (CH)

(72) Inventors: Pablo Rodriguez, Ilvesheim (DE); Prerna Juhlin, Heidelberg (DE); Jens Doppelhamer, Ladenburg (DE); Katharina Stark, Weinheim (DE); Somayeh Malakuti, Dossenheim (DE)

(73) Assignee: ABB Schweiz AG, Baden (CH)

( * ) Notice: Subject to any disclaimer, the term of this patent is extended or adjusted under 35 U.S.C. 154(b) by 1008 days.

(21) Appl. No.: 17/499,917

(22) Filed: Oct. 13, 2021

(65) Prior Publication Data

US 2022/0114493 A1    Apr. 14, 2022

(30) Foreign Application Priority Data

Oct. 14, 2020  (EP) .................................. 20201731

(51) Int. Cl.  
*G06N 20/00* (2019.01)  
*G06F 18/21* (2023.01)  
(Continued)

(52) U.S. Cl.  
CPC ............ *G06N 20/00* (2019.01); *G06F 18/214* (2023.01); *G06F 18/217* (2023.01); *G06F 18/40* (2023.01); *G06F 30/27* (2020.01)

(58) Field of Classification Search  
CPC ........ G06N 20/00; G06N 5/04; G06F 18/214; G06F 18/217; G06F 18/40; G06F 30/27; G06F 30/15  
See application file for complete search history.

(56) References Cited

U.S. PATENT DOCUMENTS

2015/0045988 A1 *  2/2015  Gusikhin ........... G07C 9/00571  
                                                              701/2  
2020/0134368 A1    4/2020  Chopra et al.  
(Continued)

FOREIGN PATENT DOCUMENTS

WO        2019040076 A1    2/2019

OTHER PUBLICATIONS

Park et al. "Intelligent Vehicle Power Control Based on Machine Learning of Optimal Control Parameters and Prediction of Road Type and Traffic Congestion", Nov. 2009 (Year: 2009).*

(Continued)

*Primary Examiner* — Reji Kartholy  
(74) *Attorney, Agent, or Firm* — Leydig, Voit & Mayer, Ltd.

(57) ABSTRACT

A system for optimal drive configuration using machine learning; the system includes: a data collector configured to collect data and establish correlations among the collected data; a training data set generator configured to compute configuration sets based on the collected data and based on the established correlations, further configured to compute measured success values for the configuration sets, further configured to generate training data sets that include the configuration sets together with corresponding measured success values; a machine learning module, configured to predict predicted success values for calculated configuration sets using the training data sets provided by the training data set generator using machine learning algorithm; and an optimization module, configured to order the calculated configuration sets, including a simulation module, configured to simulate the calculated configuration sets.

9 Claims, 3 Drawing Sheets

(51) Int. Cl.
*G06F 18/214* (2023.01)
*G06F 18/40* (2023.01)
*G06F 30/27* (2020.01)

(56) References Cited

U.S. PATENT DOCUMENTS

2020/0218208 A1* 7/2020 Alanqar ............... G05B 13/048
2021/0011475 A1* 1/2021 Haputhanthri ....... G05D 1/0088
2021/0073127 A1* 3/2021 Bielby .................. G06N 3/049

OTHER PUBLICATIONS

European Patent Office, Extended European Search Report in European Patent Application No. 20201731.5, 11 pp. (Apr. 6, 2021).
Shuai Zhao et al., "An Overview of Artificial Intelligence Applications for Power Electronics," IEEE Transactions on Power Electronics, Apr. 2021, pp. 4633-4658, Institute of Electrical and Electronics Engineers, Piscataway, NJ, United States.
Zhao et al., "An Overview of Artificial Intelligence Applications for Power Electronics," *IEEE Transactions on Power Electronics*, 36(4): 4633-4658 (Sep. 18, 2020).

* cited by examiner

SYSTEM AND METHOD FOR OPTIMAL DRIVE CONFIGURATION USING MACHINE LEARNING

CROSS-REFERENCE TO PRIOR APPLICATION

Priority is claimed to European Patent Application No. EP 20 201 731.5, filed on Oct. 14, 2020, the entire disclosure of which is hereby incorporated by reference herein.

FIELD

One or more embodiments of the present invention may relate to a system and/or a method for optimal drive configuration using machine learning.

BACKGROUND

Industrial drives are part of a powertrain, which consists of other devices such as motors and transformers. For the successful configuration of a powertrain it is necessary to know the details of the application, for instance HVAC (Heating, ventilation, and air conditioning), water pumping, machinery, and motion control. Based on the application details, it is possible to generate the configuration parameters for the controllers before the system is assembled.

Since drive is a central element in powertrain, proper configuration of drive is crucial for the customers. Wrong configuration parameters have a negative impact on the productivity of the system.

Successful drive configuration requires knowledge of system design, simulation engineering, and operation. It also requires expert knowledge honed with practical experience. Currently there is no common tool that integrates these various sources of knowledge for drive configuration.

As depicted in FIG. 1, a separate tool is used for initial powertrain selection based on available product catalogue and initial information available about the application. After the selection of drive/powertrain devices, separate tools are used for simulation and configuration of the drive.

As a result, initial configuration parameters are typically based on partial knowledge and are iteratively adjusted with simulations to achieve a suitable drive configuration which must finally be verified and typically adjusted in the real system. Taking a more holistic approach is desirable to reduce the engineering time and cost. Furthermore, misconfigurations discovered during operational phase can result in even greater impact on cost and productivity.

SUMMARY

In one or more embodiments, the present invention may provide a system for optimal drive configuration using machine learning. The system may include: a data collector configured to collect data and establish correlations among the collected data; a training data set generator configured to compute configuration sets based on the collected data and based on the established correlations, further configured to compute measured success values for the configuration sets, further configured to generate training data sets comprising the configuration sets together with corresponding measured success values; a machine learning module, configured to predict predicted success values for the calculated configuration sets using the training data sets provided by the training data set generator using machine learning algorithm; and an optimization module, configured to order the calculated configuration sets, comprising a simulation module, configured to simulate the calculated configuration sets.

In one or more embodiments, the present invention may provide a method. The method may include: collecting data and establishing correlations among the collected data by means of a data collector; computing configuration sets based on the collected data and based on the established correlations, computing measured success values for the configuration sets, generating training data sets comprising the configuration sets together with corresponding measured success values by means of a training data set generator; predicting success values for calculated configuration sets using the training data sets provided by the training data set generator using machine learning algorithm by means of a machine learning module; and ordering the calculated configuration sets by means of an optimization module and simulating the calculated configuration sets by means of a simulation module.

Therefore, it may be advantageous to have an improved technique to improve industrial drives are part of a powertrain.

An objective of one or more embodiments of the present invention may be solved with the subject matter of the independent claims, wherein further embodiments may be incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
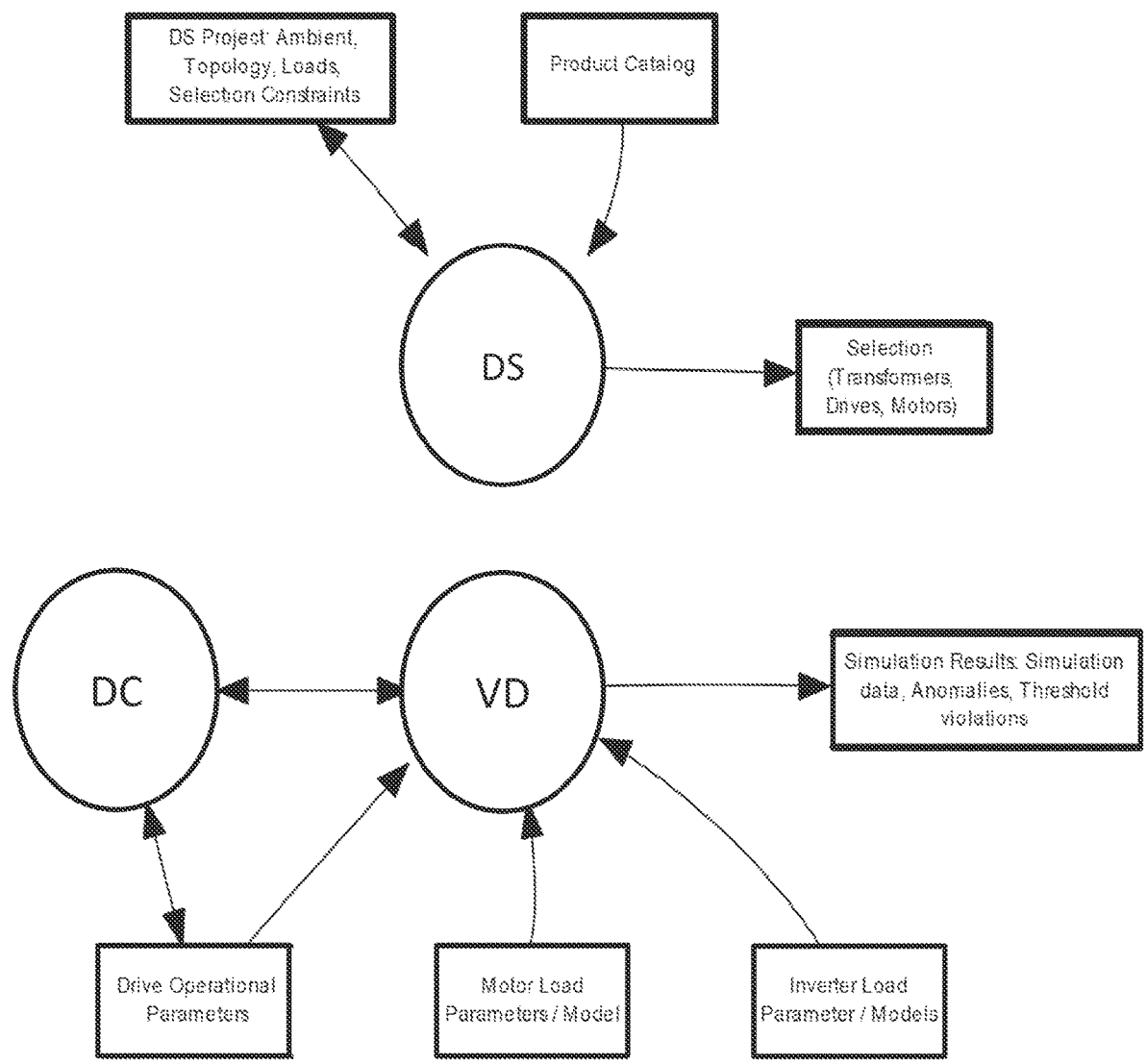
FIG. 1 shows a schematic illustration of schematic process diagram with a separate tool used for initial powertrain selection based on available product catalogue and initial information available about the application for explaining the present patent application.

One or more embodiments of the present invention may fill this gap with a system concept and corresponding methods for the configuration of drive parameters. Machine learning is used to generate optimal configuration parameters of the drive. The benefit of this approach is to reduce the engineering time, engineering effort, and maintenance of engineering tools, risks and losses for the customers when designing and operating an industrial drive system.

In a first aspect, there is provided a system for optimal drive configuration using machine learning; the system comprising:—a data collector configured to collect data and establish correlations among the collected data;—a training data set generator configured to compute configuration sets based on the collected data and based on the established correlations, further configured to compute measured success values for the configuration sets, further configured to generate training data sets comprising the configuration sets together with corresponding measured success values;—a machine learning module, configured to predict predicted success values for calculated configuration sets using the training data sets provided by the training data set generator using machine learning algorithm; and—an optimization module, configured to order the calculated configuration sets, comprising a simulation module, configured to simulate the calculated configuration sets.

According to an exemplary embodiment of the present invention, the system may further comprises a user interface module configured to provide configuration of system and to provide a visualization of the machine learning process performed by the machine learning module.

According to an exemplary embodiment of the present invention, the system may further comprises a user interface module configured to initiate a feedback mechanism used to continually improve the machine learning algorithm.

According to an exemplary embodiment of the present invention, the system may further comprises a user interface module configured to offer alternatives of machine learning algorithms to the user.

According to an exemplary embodiment of the present invention, a data collector may be configured to collect data by adopting text processing approaches or text mining approaches or extracted from customer requirements.

According to an exemplary embodiment of the present invention, the optimization module may be configured to collect real-time-series data, which may be used by the simulation module to simulate the calculated configuration sets.

According to a second aspect of the present invention, there may be provided a method, the method comprising the steps of:
collecting data and establishing correlations among the collected data by means of a data collector;
computing configuration sets based on the collected data and based on the established correlations, computing measured success values for the configuration sets, generating training data sets comprising the configuration sets together with corresponding measured success values by means of a training data set generator;
predicting success values for calculated configuration sets using the training data sets provided by the training data set generator using machine learning algorithm by means of a machine learning module; and
ordering the calculated configuration sets by means of an optimization module and simulating the calculated configuration sets by means of a simulation module.

One or more embodiments of the present invention may advantageously provide a tool for creating operational parameters for industrial drive systems created based on knowledge from various sources.

One or more embodiments of the present invention may advantageously provide that the tools can learn from experience embodied in existing expert systems, human expert training as well as knowledge gained from simulations and from installed systems. The tool may be continually updated with new experience gained from these various sources.

As input, the user describes his application, e.g. the motor load(s), ambient conditions, electrical network parameters etc. The tool then presents him the recommended drive operational parameters.

Experience is gained at least from the following sources:
i) Existing expert systems embodied in tools used e.g. during engineering
ii) Human expert knowledge
iii) Simulation results for drive systems obtained during engineering and testing, including simulations of electrical, thermal and mechanical aspects of the systems.
iv) Deployed, in-production systems data, including measurements, observed anomalies during operation and service information For the successful configuration of an industrial drive system it is necessary to know the details of the application, for instance HVAC (Heating, ventilation, and air conditioning), water pumping, machinery, and motion control. Based on the application details, it is possible to generate configuration parameters for controllers before the system is assembled.

Proper configuration is crucial for the customers. Wrong configuration parameters can have adverse impacts on the productivity of the system.

One or more embodiments of the present invention may fill this gap with a system concept and corresponding methods for the configuration of drive parameters. Machine learning is used to generate optimal configuration parameters of the drive. The benefit of this approach is to reduce the engineering time, engineering effort, maintenance of engineering tools, and risks and losses for customers when designing and operating an industrial drive system.

In a second aspect, there may be provided a method for optimal drive configuration using machine learning.

Step 1 comprises: by adopting text processing approaches such as NLP or text mining approaches, the parameters of interest are extracted from the customer requirements.

Step 2 comprises: Based on identified system description in Step 1, machine learning provides drive configuration parameter sets with highest success values (i.e. above a certain threshold value) known so far (candidates).

Step 3 comprises: All candidates are evaluated in simulation (either in parallel or iteratively maybe as cloud service).

Step 4 comprises: a report is generated offering the results of all candidates.

Step 5 comprises: If the simulation results converge, the best set of drive configuration parameters is offered to the user. Otherwise, the above steps are repeated with better design requirements or constraints in Step 1 or higher success threshold value in Step 2 until convergence is achieved.

Step 6 comprises: Learning by imitation. Expert engineer takes the automatically selected drive configuration parameter set. The expert might change things during commissioning. These changes are fed back to the machine learning module to learn how to fine tune/configure the real system.

Step 7 comprises: Simulation improvements: During commission, real-time-series data are collected to improve simulation models (simulation parameter identification and optimization).

Step 8 comprises: While servicing, Alarm & Events logs are collected and fed back the to the machine learning module, for learning from event patterns.

Step 9 comprises: Time-series data is used to optimize simulation and learned models.

Step 10 comprises: This process can at any point in time be stopped, e.g., after first parameterization of drive or after multiple iterations of improvements.

Nevertheless, data collection part from real drive can continue to be use for future systems.

When done iteratively, the method can generate an optimal set of drive configuration parameters in Step 2.

According to a further aspect, a computer program element for operating a system may be provided, which, when being executed by a unit, is adapted to perform the method according to the first aspect.

According to a further aspect, there may be provided a computer-readable medium having stored the computer program element of the fifth aspect. The computer-readable medium may be provided as physical data carrier, such as a CD-ROM, a USB stick, or the like, or may be provided digitally via a communications network, such as the Internet.

For example, the computer program element may also be transmitted by a wireless communications network and/or directly to an on-board receiver on the application device, and/or by means such as Bluetooth, Wireless LAN (Wi-Fi), etc.

Advantageously, the benefits provided by any of the above aspects and examples equally apply to all of the other aspects and examples and vice versa.

These and other aspects of the present invention will become apparent from and elucidated with reference to the embodiments described hereinafter.

The above aspects and examples will become apparent from and be elucidated with reference to the embodiments described hereinafter.

FIG. 1 shows a schematic illustration of schematic process diagram with a separate tool used for initial powertrain selection based on available product catalogue and initial information available about the application for explaining the present patent application.

Figure 2:
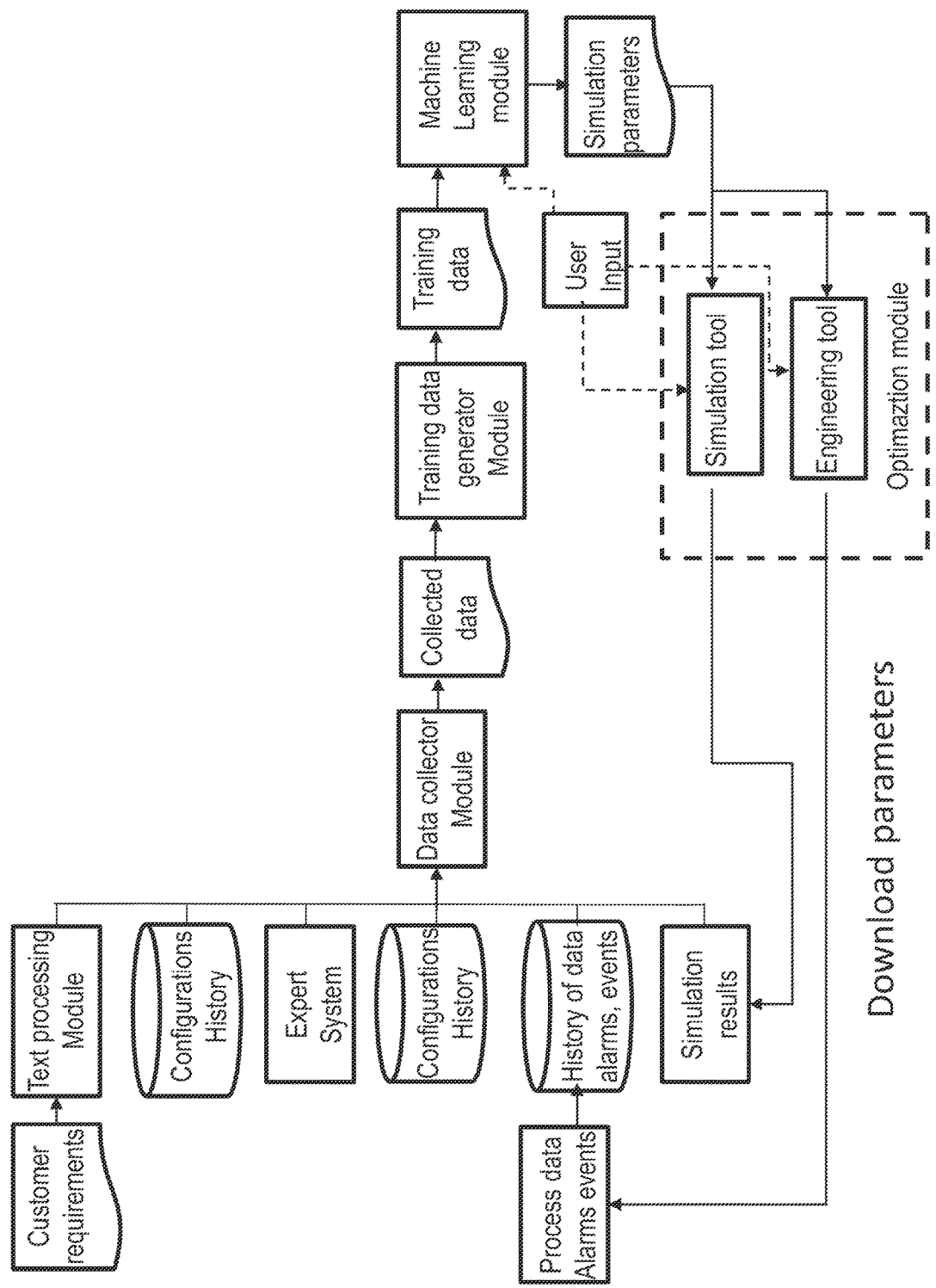
FIG. 2 shows an example of a method for optimal drive configuration using machine learning according to an exemplary embodiment of the present patent application.

FIG. 2 shows an example of a method for optimal drive configuration using machine learning according to an exemplary embodiment of the present patent application.

Figure 3:
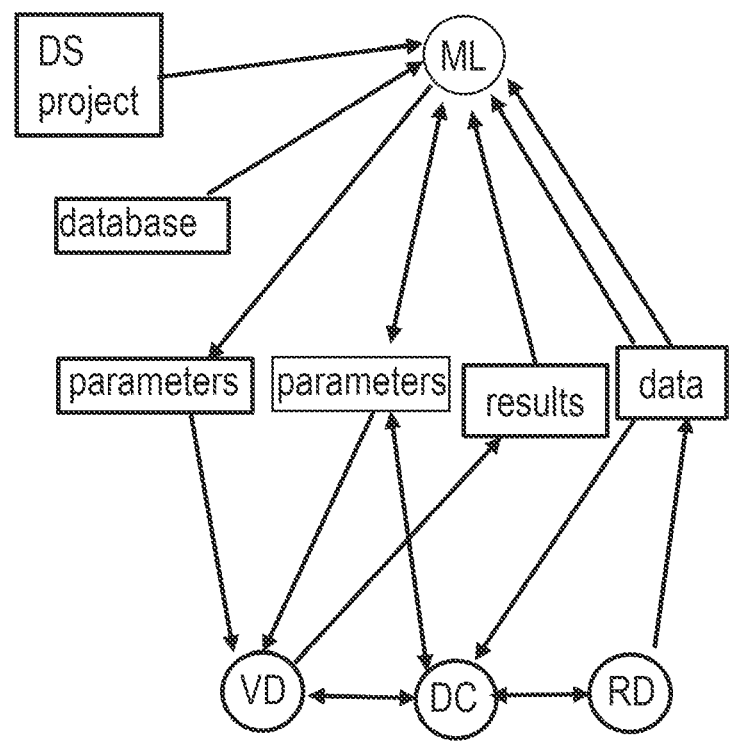
FIG. 3 shows an example of a method for optimal drive configuration using machine learning according to an exemplary embodiment of the present patent application.

FIG. 3 shows an example of a method for optimal drive configuration using machine learning according to an exemplary embodiment of the present patent application.

FIG. 1 shows a DriveSize, DS, connected with a Virtual Drive, VD, simulation engine, and a drive composer, DC.

For the successful configuration of an industrial drive system it is necessary to know the details of the application, for instance HVAC (Heating, ventilation, and air conditioning), water pumping, machinery, and motion control. Based on the application details, it is possible to generate the configuration parameters for the controllers before the system is assembled.

Proper configuration is crucial for the customers. Wrong configuration parameters can have negative impacts on the productivity of the system.

FIG. 2 shows an example of a method for optimal drive configuration using machine learning according to an exemplary embodiment of the present patent application.

According to an exemplary embodiment of the present patent application a tool for making engineering decisions is provided based on data collected from various sources is created. The engineering tool learns the task of making the decisions based on the data, without being explicitly programmed. The system improves as more data becomes available over time.

According to an exemplary embodiment of the present patent application data from various sources is used to create a model for industrial engineering decisions. Sources include existing expert systems, human experts, simulation results, observations from production systems.

According to an exemplary embodiment of the present patent application, the method includes and is based on easy to obtain training data samples, e.g. from existing expert systems, may be used to initialize the training data set.

According to an exemplary embodiment of the present patent application, the training data set is continually updated with new samples from other sources.

According to an exemplary embodiment of the present patent application, the data from different sources may require appropriate weighting in the creation and updating of the training data set.

According to an exemplary embodiment of the present patent application, the active learning techniques may be used to request more expensive training data samples, e.g. from computationally expensive simulation experiments.

According to an exemplary embodiment of the present patent application, the supervised learning and appropriate learners are used to create a model for the creation of operational drive parameters from the training data set.

According to an exemplary embodiment of the present patent application, the engineering data collected over the whole lifecycle of drive system installation is collected and used to create the training data.

According to an exemplary embodiment of the present patent application, the machine learning is used to create operational drive parameters.

According to an exemplary embodiment of the present patent application, the learner builds a model using:
Simulation results during engineering
Configuration parameters before and after commissioning
Configuration parameters during the life-cycle (servicing)
Alarms and Event logs
Time series data
Changes done by experts According to an exemplary embodiment of the present patent application, the learner will detect patterns of successful device parameterization over the life-cycle of the system (from engineering, commissioning and operation).

According to an exemplary embodiment of the present patent application, the learner will detect patterns of wrong/bad configurations.

According to an exemplary embodiment of the present patent application, the above model would be continually refined and improved during routine engineering tasks and operations to incorporate up-to-date findings and serve as a continually reliable tool.

According to an exemplary embodiment of the present patent application, the overall system comprises a drive engineering tool (e.g. Drive Composer Pro), a simulation module consisting of process/mechanical Model (motor load), electrical Model (Motor, Inverter, Trafo), thermal Model (motor and Inverter), virtual drive controller According to an exemplary embodiment of the present patent application, the learning module comprising of a data collection module that collects data from: feature extraction from customer documents, such as ambient parameters, technical requirements from the industrial application.

Example: Water pumping station describing the technical requirements, expected input and output water pressure According to an exemplary embodiment of the present patent application, the simulation results are provided in a database of working/successful configurations.

According to an exemplary embodiment of the present patent application, the simulation results are provided as a history of changes of configuration parameters from tools (e.g. Drive Composer Pro, PLM or versioning system)

According to an exemplary embodiment of the present patent application, alarm and/or event logs are logged by the system.

According to an exemplary embodiment of the present patent application, a training data set generator is configured to get data from data collection, compute configuration success values for different configuration sets based on the information gathered from the Data collection module.

According to an exemplary embodiment of the present patent application, a training data set generator is configured to generate training data sets comprising of possible configuration sets together with corresponding success values obtained in the step above.

According to an exemplary embodiment of the present patent application, a training data set generator is configured to a machine learning (data analytics) module is configured to predict success values for new configuration sets using the training data sets provided by the training data set generator.

According to an exemplary embodiment of the present patent application, a training data set generator is configured to finds the most successful configuration sets for user input data.

According to an exemplary embodiment of the present patent application, a optimization module is configured to use the hitherto most successful drive configuration sets provided by the machine learning module and tests them in the simulation module.

According to an exemplary embodiment of the present patent application, a user interface module is used for allowing configuration and visualization of the machine learning process, feedback mechanism used to continually improve the machine learning algorithm, offering alternatives to the user.

FIG. 3 shows an example of a method for optimal drive configuration. As parameters simulation parameters may be used, or drive operational parameters. The usage of the parameters may be iterated in parallel. Simulation results may be given in simulation data, anomalies, or threshold violations. The database may comprise successful working configuration parameters or equivalent set of data. The DS project may have sets of ambient, topology of loads, and selections constraints.

FIG. 3 shows an example of a method for optimal drive configuration. The machine learning module, ML, uses simulation values, installed base, configuration parameters, changes during lifecycle, user knowledge/additional constrains, learning with different weights (bidding, engineering, operation). The machine learning module, ML, generates drive parameters and simulation parameters.

While one or more embodiments of the present invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for optimal drive configuration using machine learning, the system comprising;
a non-transitory computer-readable medium comprising:
a data collector configured to collect data and establish correlations among the collected data, wherein the data collector is configured to collect the data by adopting text processing approaches or text mining approaches to extract features from customer documents and technical requirements of an industrial application associated with the drive;
a training data set generator configured to compute configuration sets for the drive based on the collected data and based on the established correlations, further configured to compute measured success values for the computed configuration sets, further configured to generate training data sets comprising the computed configuration sets together with corresponding measured success values;
a machine learning module, configured to predict predicted success values for the computed configuration sets using the training data sets provided by the training data set generator using a machine learning algorithm;
an optimization module, configured to order the computed configuration sets that has the predicted success values above a certain threshold, comprising a simulation module, configured to simulate the ordered configuration sets and evaluate results for convergence; and
a user interface module configured to present a graphical user interface with the computed configuration sets for which the results are converged, and initiate a feedback mechanism for a user to provide feedback regarding the presented configuration sets such that the feedback is used to tune the machine learning algorithm to achieve the optimal drive configuration.

2. The system according to claim 1,
wherein the user interface module is configured to provide configuration of the system and to provide a visualization of a machine learning process performed by the machine learning module.

3. The system according to claim 1,
wherein the user interface module is configured to offer alternatives of machine learning algorithms to the user.

4. The system according to claim 1,
wherein the optimization module is configured to collect real-time-series data, which are used by the simulation module to simulate the computed configuration sets.

5. The system according to claim 1, wherein engineering data collected over a lifecycle of a drive system installation is collected and used to generate the training data sets.

6. The system according to claim 1, wherein simulation results of simulating the ordered configurations sets by means of the simulation module are provided as a history of changes of configuration parameters from tools of the system.

7. A method for optimal drive configuration for a system using machine learning, the method comprising:
   collecting data and establishing correlations among the collected data, wherein the data is collected by adopting text processing approaches or text mining approaches to extract features from customer documents and technical requirements of an industrial application associated with the drive;
   computing configuration sets for the drive based on the collected data and based on the established correlations, computing measured success values for the computed configuration sets, generating training data sets comprising the computed configuration sets together with corresponding measured success values;
   predicting predicted success values for the computed configuration sets using the training data sets using a machine learning algorithm;
   ordering the computed configuration sets that has the predicted success values above a certain threshold and simulating the ordered configuration sets to evaluate results for convergence; and
   presenting a graphical user interface with the computed configuration sets for which the results are converged, and initiate a feedback mechanism for a user to provide feedback regarding the presented configuration sets such that the feedback is used to tune the machine learning algorithm to achieve the optimal drive configuration.

8. The method according to claim 7,
   wherein the method further comprises providing a configuration of the system and providing a visualization of a machine learning process performed based on the machine learning algorithm.

9. A computer program element stored on a non-transitory computer-readable medium, which when executed by the system according to claim 1, is configured to carry out a method comprising:
   collecting data and establishing correlations among the collected data, wherein the data is collected by adopting text processing approaches or text mining approaches to extract features from customer documents and technical requirements of an industrial application associated with the drive;
   computing configuration sets for the drive based on the collected data and based on the established correlations, computing measured success values for the computed configuration sets, generating training data sets comprising the computed configuration sets together with corresponding measured success values;
   predicting predicted success values for the computed configuration sets using the training data sets using a machine learning algorithm;
   ordering the computed configuration sets that has the predicted success values above a certain threshold and simulating the ordered configuration sets to evaluate results for convergence; and
   presenting a graphical user interface with the computed configuration sets for which the results are converged, and initiate a feedback mechanism for a user to provide feedback regarding the presented configuration sets such that the feedback is used to tune the machine learning algorithm to achieve the optimal drive configuration.

* * * * *